United States Patent [19]

Yallourakis

[11] 3,988,493

[45] Oct. 26, 1976

[54] POLYMER POWDER COATING COMPOSITION

[75] Inventor: Michael Dimitri Yallourakis, Wilmington, Del.

[73] Assignee: E. I. Du Pont de Nemours and Company, Wilmington, Del.

[22] Filed: Jan. 23, 1975

[21] Appl. No.: 543,448

[52] U.S. Cl. .......................... 428/327; 260/31.8 B; 260/42.43; 260/42.24; 260/45.75 S; 260/837 PV; 428/323; 428/328; 428/418; 428/463; 428/470
[51] Int. Cl.² ................... B32B 5/16; B32B 15/08; C08F 14/06
[58] Field of Search .......... 428/463, 418, 327, 323, 428/328, 470; 260/837 PV, 45.75 S, 31.8 B, 42.43, 42.24

[56] References Cited

UNITED STATES PATENTS

| | | | |
|---|---|---|---|
| 2,726,254 | 12/1955 | Leistner | 260/45.75 S |
| 2,746,946 | 5/1956 | Weinberg | 260/45.75 S |
| 2,965,586 | 12/1960 | Fisch | 260/837 PV |
| 3,090,763 | 5/1963 | Hillier | 260/837 PV |
| 3,137,666 | 6/1964 | Lox | 428/463 |
| 3,819,560 | 6/1974 | Kehr | 260/837 PV |

FOREIGN PATENTS OR APPLICATIONS

| | | | |
|---|---|---|---|
| 916,777 | 1/1963 | United Kingdom | 428/418 |
| 961,054 | 6/1964 | United Kingdom | 260/837 PV |

Primary Examiner—George F. Lesmes
Assistant Examiner—Ellis P. Robinson

[57] ABSTRACT

A powder coating composition consisting essentially of powder particles that have diameters of less than 100 microns, wherein the powder particles consist essentially of a blend of:

A. vinyl chloride/vinyl acetate/maleic anhydride polymer,

B. plasticizer,

C. liquid epoxy resin, and

D. a mixture of mono-butyl tin mercaptide and di-butyl tin mercaptide.

The powder coating composition is useful for providing film coatings upon the metal exteriors of products such as tubing, wires, fence posts, lawn furniture and the like.

12 Claims, No Drawings

POLYMER POWDER COATING COMPOSITION

BACKGROUND OF THE INVENTION

1. Field of the Invention:

This invention relates to a vinyl chloride/vinyl acetate/maleic/anhydride (VC/VA/MA) polymer powder coating composition.

2. Prior Art:

Powder coating compositions based on a polymer of VC/VA/MA are known in the art; however, the known powder coating compositions are deficient in several important properties. These deficiencies prevent the known powder coating compositions from producing commercially superior coated metal products requiring a minimum of time and treatment to manufacture.

One deficiency is the known powder coating compositions' adhesive properties. Adhesive properties which are inadequate to produce commercially acceptable products prevent the known powder coating compositions from being adhered directly to metal substrates. To increase the adhesion between metal substrates and the known powder coating compositions the metal substrates are treated prior to being coated, thus producing another process step during the manufacture of coated products.

Another deficiency is the known powder coating compositions' thermostability. The known powder coating compositions do not have sufficient thermostability to prevent the VC/VA/MA polymer from being degraded during fusion at temperatures above 155° C. This deficiency results in fusion being performed at lower temperatures for longer periods of time which increases manufacturing time, thereby decreasing the potential maximum production output.

The powder coating composition of this invention, unexpectedly and non-obviously, possesses excellent adhesion to untreated metal substrates and superior thermostability thereby allowing fusion at temperatures above 155° C.

SUMMARY OF THE INVENTION

The powder coating composition of this invention consists essentially of powder particles having diameters of less than 100 microns. each powder particle consists essentially of a blend of:

A. 50–93% by weight of vinyl chloride/vinyl acetate/maleic anhydride (VC/VA/MA) polymer having a monomer weight ratio range for each monomer of VC 55–95 parts, VA 5–35 parts and MA .2–10 parts and having a number average molecular weight range of 20,000–50,000, B. 5–30% by weight of plasticizer, C. 1–10% by weight of liquid epoxy resin, and D. 1–10% by weight of a mixture of mono-butyl tin mercaptide and di-butyl tin mercaptide.

DESCRIPTION OF THE INVENTION

The powder coating composition of this invention consists essentially of powder particles having diameters of less than 100 microns as measured by sieve analysis, ASTM D 1921–63 (Method D).

About 50–93% by weight of the powder coating composition is a polymer or mixture of polymers of vinyl chloride/vinyl acetate/maleic anhydride (VC/VA/MA). The polymer has a monomer weight ratio range for each monomer of VC 55–95 parts, VA 5–35 parts and MA .2–10 parts. A preferred VC/VA/MA polymer has a monomer weight ratio of 80/20/1. The polymer has a number average molecular weight of 20,000–50,000, preferably 22,000–30,000. The number average molecular weight of the polymer is determined by gel permeation chromatography using polystyrene as the standard.

About 5–30% by weight of the composition is a plasticizer or mixture of plasticizers. Selection of the proper plasticizers both as to type and concentration will influence not only melt flow behavior and ultimate physical properties of the fused film but also storage stability of the powder coating composition. Higher molecular weight adipates and phthalates, such as di-tridecyl phthalate, and higher molecular weight esters of trimellitic anhydride, such as triisodecyl trimellitate, have high Tg°C and, therefore, help produce stable powder coating compositions which when fused exhibit excellent flexibility and impact resistance.

About 1–10% by weight of the composition is one or more liquid epoxy resin. A liquid epoxy resin such as the liquid condensation polymer of bisphenol A/epichlorohydrin is utilized to achieve maximum heat stability.

About 1–10% by weight of the composition is a mixture of mono-butyl tin mercaptide and di-butyl tin mercaptide. This mixture provides thermostability to the powder coating composition. The preferred mixture has an approximate tin content of 21–25% and an approximate sulfur content of 9–12%. A more preferred mixture has an approximate tin content of 23.5%; approximate sulfur content of 10.5%; and viscosity, measured by ASTM-1545-63, of about B.

The composition of the invention can contain adjuncts such as ultraviolet light absorbers, composition handling improving agents, pigments, fillers and/or other components known to artisans. These adjuncts are useful for purposes known to artisans. The adjunct or adjuncts utilized must be stable at temperatures and for periods of time required for fusion of the powder coating composition.

A preferred green powder coating composition consists of 1–10% by weight of the composition of pigment. The pigment consists essentially of titanium dioxide, carbon black, phthalocyanine green and chrome antimony titanate. The amount of each pigment component can vary depending on which green hue is desired.

Known green powder coating compositions utilize yellow iron oxide as one of the pigments. Yellow iron oxide does not have sufficient thermostability for use in the composition of this invention. During fusion of compositions containing iron oxide at temperatures above 175° C sustained for more than 5 minutes, the iron oxide degrades. This degradation, in turn, degrades the VC/VA/MA polymer and causes the polymer to turn black. The use of chrome antimony titanate, which has a spectrum curve similar to iron oxide, instead of iron oxide, prevents the polymer from being degraded and turning black.

A more preferred green powder coating composition consists of powder particles that have diameters of less than 100 microns and that consist essentially of a blend of:

A. 50–75% by weight of vinyl chloride/vinyl acetate/maleic anhydride (VC/VA/MA) polymer having a monomer weight ratio range for each monomer of VC 55–95 parts, VA 5–35 parts and MA .2–10 parts and having a number average molecular weight of 20,000–50,000, B. 12–18% by weight of triisodecyl trimellitate,
C. 2–4% by weight of a liquid epoxy resin of bisphenyl A/epichlorohydrin,
D. 1,5–3% by weight of a mixture of mono-butyl tin mercaptide and di-butyl tin mercaptide with an approximate tin content of 21–25% and approximate sulfur content of 9–12%,
E. .2–.4% by weight of 2-hydroxy-4-n-octoxybenzophenone,
F. .2–.4% by weight of a low molecular weight polyethylene wax,
G. 5–8% by weight of pigments selected from
 1. titanium dioxide,
 2. carbon black,
 3. phthalocyanine green,
 4. chrome antimony titanate, and optionally,
H. up to 20% by weight of barium sulfate.

One method for preparing the powder coating composition of this invention is to melt blend the constitutents and then pass the blend through a conventional extruder. The extrudate is reduced to a powder using conventional grinding equipment, e.g., a pin disc mill, a fluid energy mill, or a hammer mill. After grinding, the powder is passed through a sieve to remove large particles. Usually a 200 mesh sieve (74 microns) is used.

Application of the Powder Coating Composition

The powder coating composition of this invention can be applied to hot or cold metal substrates by utilizing fluidized bed or electrostatic spray techniques. Preferably, electrostatic spraying is utilized in which a voltage of 20–100 kilovolts is applied to a spray gun. The powder coating composition is applied in several passes to provide a thickness after fusion of 2–10 mils, preferably 3–5 mils, and then baked at 175°–210° C for 4 to 15 minutes, preferably 200°–210° C for 4 to 6 minutes, to fuse the powder particles into a continuous, uniform coating.

The powder coating composition of this invention can be applied to untreated metal substrates. Also, the composition can be used directly over galvanized or phosphatized steel.

The powder coating composition is useful for providing film coatings upon the metal exteriors of products such as tubing, wires, fence posts, lawn furniture and the like.

The following example illustrates the invention. All quantities are on a weight basis unless otherwise indicated.

EXAMPLE 1

The following solid ingredients are dry blended in a Marion mixer for 20 minutes:

| | Parts by Weight |
|---|---|
| vinyl chloride/vinyl acetate/maleic anhydride polymer having a monomer weight ratio of 80/20/1 and number molecular weight of 25,500. ("Bakelite" E 2000 sold by Union Carbide Corporation) | 100.00 |
| 2-hydroxy-4-n-octoxybenzophenone | .50 |
| a low molecular weight homopolymer of ethylene wax ("Bareco" polywax 2000 sold by Petrolite Corporation) | .50 |
| titanium dioxide | .35 |
| phthalocyanine green | 3.38 |
| carbon black | .31 |
| chrome antimony titanate ("Ferro" V9118 sold by Ferro Corporation) | 6.01 |

| | Parts by Weight |
|---|---|
| barium sulfate | 20.00 |

The following liquid ingredients are preblended with an air mixer agitator:

| | Parts by Weight |
|---|---|
| triisodecyl trimellitate | 25.0 |
| a liquid condensation polymer of bisphenol A/epichlorohydrin ("ERL" Epoxy 2774 sold by Pfizer, Incorporated) | 5.0 |
| a mixture of mono-butyl tin mercaptides and di-butyl tin mercaptides having an approximate tin content of 23.5% and an approximate sulfur content of 10.5% ("Ferro" 886 sold by Ferro Corporation) | 3.0 |

The liquid preblend is added slowly to the solid blend under constant agitation.

The blended ingredients are melt mixed in a Baker-Perkins extruder at 90 revolutions per minute and 95°–99° C. The extrudate is cooled between chilled rolls and then blended with dry ice and fed through an Alpine grinder to produce 3 millimeter size pellets. Cryogenic grinding of the pellets is done with liquid nitrogen at −185° C using a Pallman Pulverizers grinder. The powder is then passed through a 200 mesh sieve to remove large particles.

The powder coating composition is then sprayed onto a phosphatized 24 gauge cold rolled steel panel using a Model 222 Ransburg electrostatic powder gun. The powder is delivered from a reservoir to the gun by means of an air stream. The gun utilizes 60 volts of electricity to charge the powder particles and 60 pounds per square inch air pressure. The coated panel is baked for 5 minutes at 205° C. The resulting coating has an excellent appearance. It is smooth, even, and free from popping and cratering.

What is claimed is:

1. A powder coating composition consisting essentially of powder particles having diameters of less than 100 micron; wherein the powder particles consist essentially of a blend of:
 A. 50–93% by weight of vinyl chloride/vinyl acetate/maleic anhydride (VC/VA/MA) polymer having a monomer weight ratio range for each monomer of VC 55–95 parts, VA 5–35 parts and MA .2–10 parts and having a number average molecular weight range of 20,000–50,000,
 B. 5–30% by weight of plasticizer,
 C. 1–10% by weight of liquid epoxy resin and,
 D. 1–10% by weight of a mixture of mono-butyl tin mercaptide and di-butyl tin mercaptide.

2. The composition of claim 1 wherein the mixture of mono-butyl tin mercaptide and di-butyl tin mercaptide has a tin content of 21–25% and sulfur content of 9–12%.

3. The composition of claim 1 containing one or more ultraviolet light absorber, pigment and/or filler.

4. The composition of claim 3 wherein 1–10% by weight of the composition consists of pigment; said pigment consisting essentially of titanium dioxide, carbon black, phthalocyanine green and chrome antimony titanate.

5. The composition of claim 3 wherein the pigment consists essentially of:
A. 3–4% by weight, based on weight of total pigment, of titanium dioxide,
B. 3–4% by weight, based on weight of total pigment, of carbon black,
C. 32–36% by weight, based on weight of total pigment, of phthalocyanine green, and
D. 58–62% by weight, based on weight of total pigment, of chrome antimony titanate.

6. The powder coating composition of claim 1 wherein the powder particles consist essentially of a blend of:
A. 50–75% by weight of vinyl chloride/vinyl acetate/maleic anhydride (VC/VA/MA) polymer having a monomer weight ratio range for each monomer of VC 55–95 parts, VA 5–35 parts and MA .2–10 parts and having a number average molecular weight range of 20,000–50,000,
B. 12–18% by weight of triisodecyl trimellitate,
C. 2–4% by weight of a liquid epoxy resin of bisphenol A/epichlorohydrin,
D. 1.5–3% by weight of a mixture of mono-butyl tin mercaptide and di-butyl tin mercaptide, said mixture having an approximate tin content of 21–25%, an approximate sulfur content of 9–12% and a viscosity, measured by ASTM-1545-63, of about B.
E. .2–.4% by weight of 2-hydroxy-4-n-octoxybenzophenone,
F. .2–.4% by weight of a low molecular weight polyethylene wax,
G. 5–8% by weight of pigment consisting essentially essentially of
  1. titanium dioxide,
  2. carbon black,
  3. phthalogyanine phthalocyanine and
  4. chrome antimony titanate, and optionally,
H. up to 20% by weight of barium sulfate.

7. The composition of claim 6 wherein the polymer of (A) has a monomer weight ratio of
  1. vinyl chloride 80
  2. vinyl acetate 20
  3. maleic anhydride 1.

8. The composition of claim 6 wherein the pigment consist essentially of
A. 3–4% by weight, based on weight of total pigment, of titanium dioxide,
B. 3–4% by weight, based on weight of total pigment, of carbon black,
C. 32–36% by weight, based on weight of total pigment, of phthalocyanine green, and
D. 58–62% by weight, based on weight of total pigment, of chrome antimony titanate.

9. A metal substrate coated with a coalesced layer of the powder coating composition of claim 1.

10. A metal substrate coated with a coalesced layer of the powder coating composition of claim 6.

11. The coated metal substrate of claim 9 in which the metal is steel.

12. The coated metal substrate of claim 10 in which the metal is steel.

* * * * *